United States Patent [19]

Hiatt

[11] 3,922,934
[45] Dec. 2, 1975

[54] MACHINE FOR PREPARING CABLE
[75] Inventor: Robert Cooper Hiatt, Hillsboro, Oreg.
[73] Assignee: Tektronix Inc., Beaverton, Oreg.
[22] Filed: Apr. 15, 1974
[21] Appl. No.: 461,043

[52] U.S. Cl. .................................. 81/9.51; 81/9.51
[51] Int. Cl.² .......................................... H02G 1/12
[58] Field of Search ..................................... 81/9.51

[56] References Cited
UNITED STATES PATENTS
3,782,227   1/1974   Veenendaal ........................ 81/9.51
3,817,127   6/1974   Soeller ............................... 81/9.51
FOREIGN PATENTS OR APPLICATIONS
199,712   11/1965   Sweden ............................... 81/9.51

*Primary Examiner*—Al Lawrence Smith
*Assistant Examiner*—Roscoe V. Parker
*Attorney, Agent, or Firm*—Adrian J. LaRue

[57] ABSTRACT

A machine for preparing cable is provided which has an adjustable block portion and an opening therethrough for receiving insulated conductors and includes securing and shearing members mounted thereon. A cable preparation area has an opening therein for receiving insulated conductors passing through the adjustable block portion. The machine is characterized in that, simultaneously, insulated conductors may be sheared and prepared at their ends respectively.

11 Claims, 5 Drawing Figures

MACHINE FOR PREPARING CABLE

BACKGROUND OF THE INVENTION

The present invention relates to a machine for simultaneously shearing cable, and for shearing and stripping insulation from conductor means and more particularly from ribbon cable.

U.S. Patent Application Ser. No. 159,792 filed July 6, 1971, now U.S. Pat. No. 3,782,227, and assigned to the present assignee is directed to an insulation-slitting and stripping machine for splitting, splaying, stripping and shearing the electrical conductors at ends of ribbon cable. This machine includes slitting and splaying dies for splitting and splaying the insulated electrical conductors and a movable carriage which carries spring-biased stripping and shearing members and they are operated by engagement with cams to strip and shear the conductor ends to the same length or to random lengths as the carriage is moved relative to the split and splayed conductors.

U.S. Patent Application Ser. No. 299,311 filed Oct. 19, 1972, now U.S. Pat. No. 3,817,127 and assigned to the present assignee is directed to a machine for shearing and stripping cable insulation from the electrical conductors at ends of ribbon cable. This machine includes a movable block which has openings therethrough for receiving individual insulated conductors that have been slit and splayed at an end of a ribbon cable by slitting and splaying dies. Shearing and stripping members are mounted on the movable block via a slide assembly which moves linkage members pivotally connected to the shearing and stripping members along cam surfaces so that right angled movement of the shearing and stripping members is effected.

A main disadvantage associated with each of the above described applications is that complex electronic control means must be implemented for determining the amount of cable prepared. Another disadvantage is cable length inaccuracy, i.e., the overall length of the prepared cable must be manually cut to the desired length.

SUMMARY OF INVENTION

Accordingly, the present invention relates to a machine for simultaneously shearing cable to the desired length, and preparing the cable ends thereof. The machine is provided with an adjustable block which has an opening therethrough for receiving insulated conductors. A cable preparation area is provided which is movable relative to the adjustable block and has openings therethrough for receiving the insulated conductors. The machine also includes an electrical-mechanical control to determine the length of cable prepared.

It is therefore an object of the present invention to provide a machine for preparing insulated conductors which overcomes the disadvantages of the prior art.

It is another object of the present invention to provide a machine for simultaneously shearing cable, and shearing and stripping cable insulation.

It is yet another object of the present invention to provide a machine for preparing insulated conductors having cable length determining means.

It is still another object of the present invention to provide a machine for preparing cable which has minimum construction.

It is still yet another object of the present invention to provide a machine for preparing cable having means for automatically moving a preparation area between an open position and a closed position.

The foregoing and numerous other objects, advantages, and inherent functions of the present invention will become apparent as the same is more fully understood from the following description, which describes the present invention; it is to be understood, however, that these embodiments are not intended to be exhausting nor limiting of the invention, but are given for purposes of illustration in order that others skilled in the art may fully understand the invention and principles thereof and the manner of applying it in practical use so that they may modify it in various forms, each as may best be suited to the conditions of the particular use.

DESCRIPTION OF INVENTION

Figure 1:
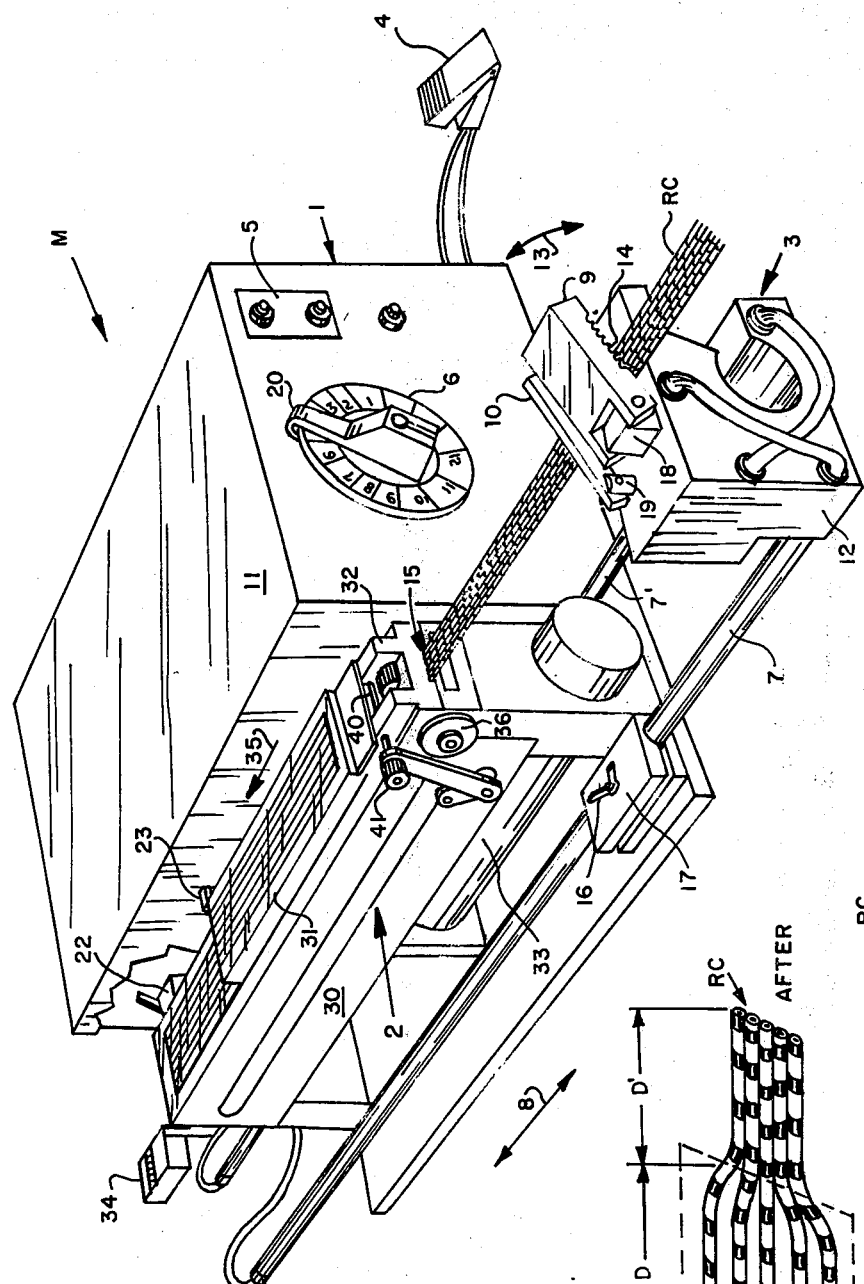
FIG. 1 is a perspective view of the machine for preparing cable according to the present invention.

Referring now to the drawings, there is shown the machine M according to the present invention. Machine M consists of three basic units; a control unit 1, cable preparation unit 2, and a movable length determining unit 3. Included as a sub-unit of control unit 1 is an activator unit 4.

Operation control means 5 and a feed control means 6 are mounted on and connected therethrough the external surface of the control unit 1 to electrical-mechanical and pneumatic function means therein. A cover member 11, which can easily be removed to provide access to the above mentioned means, completes the control unit 1.

Cable preparation unit 2 can be as described in Ser. No. 159,792 or Ser. No. 229,311. It should be noted however that other types of preparation units could be used, say, for removing insulation between sheared ends of insulated conductors. For this reason, the preparation unit 2 will not be discussed in depth. An exception, however, will be a complete description of the means for moving the preparation unit between a closed position for receiving cable to be prepared and an open position for removing the prepared cable. Preparation unit 2 basically consists of a stationary portion 30, a movable carriage 31, a movable block portion 32 and a pneumatic cylinder 33 mounted onto stationary portion 30. A groove 15 is provided between movable block portion 32 and stationary member 30 when in the position shown in FIG. 1. A counter 34 is also included.

Movable length determining unit 3 is movably attached to cable preparation unit 2 via mount-function members 7 and 7' and is movable in the direction of double headed arrow 8. The unit is secured into a selected position by clamp means 17 by tightening means 16. Unit 3 includes a securing member 9 and a cutting member 10, both of which are pivotally connected to a support member 12 by means of connectors 18 and 19, respectively. Securing and cutting members 9 and 10 are independent of each other and are automatically moved in the direction of the arcuate double headed arrow 13 by conventional pneumatic means.

Figure 5:
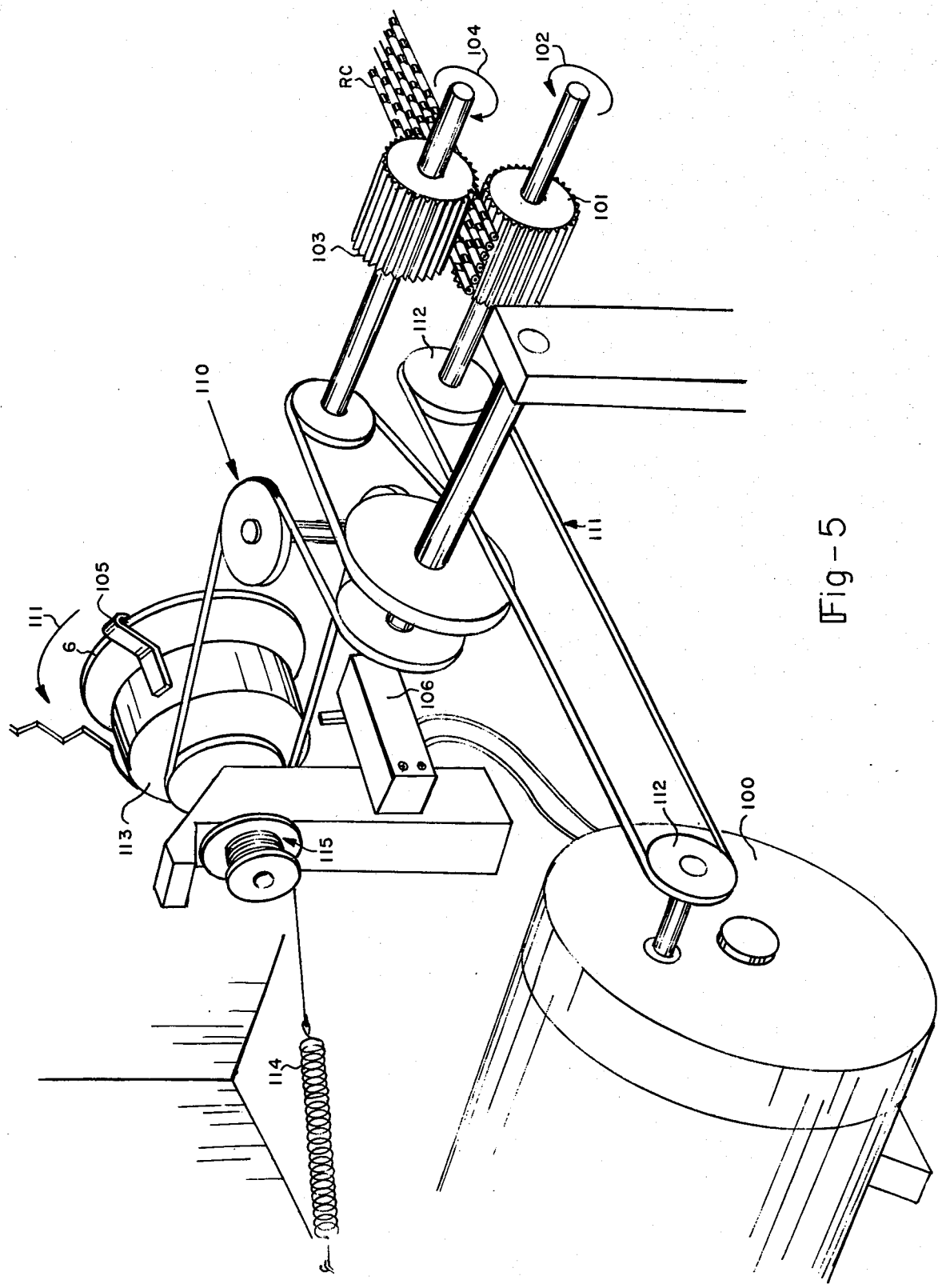
FIG. 5 is a perspective view showing details of the electrical-mechanical feed and control portion of the machine for preparing cable according to the present invention.

To understand basic operation of the machine M, a complete cycle of operation will be discussed. Reference should also be made in particular to FIGS. 1, 2, and 5. The conventional flat-ribbon type cable, hereinafter referred to as cable RC, is shown before and after preparation. The preparation unit 2 required to prepare cable RC as shown having splayed and stripped end area SS (enclosed by dotted lines) was chosen for reasons of explanation only and, as previously mentioned, could be any such unit required for a particular need.

Operation control means 5 is placed in the operate position to apply power to the machine M. Activator member 4, which can be any conventional activator such as a foot switch, etc., is activated. This causes drive means 100 (a motor, etc.,) to become active, and electrical mechanical clutch 113 to become active, and the preparation and movable length units to be in a condition to receive cable RC. Thus, drive means 100 via conventional drive mechanisms such as a belt and pulley assembly 111 and 112 respectively, turns a drive roller 101 in the direction of annular arrow 102, electrical mechanical clutch 113 connects feed control means 6, cylinder 33 of preparation unit 2 moves the movable carriage 31 and movable block portion 32 into position for receiving cable RC to be prepared. (This position or condition is shown in FIG. 1 whereby members 9 and 10 are in an "up" position and a groove 15 exists between movable and stationary portions 32 and 30 respectively.)

Figure 2:
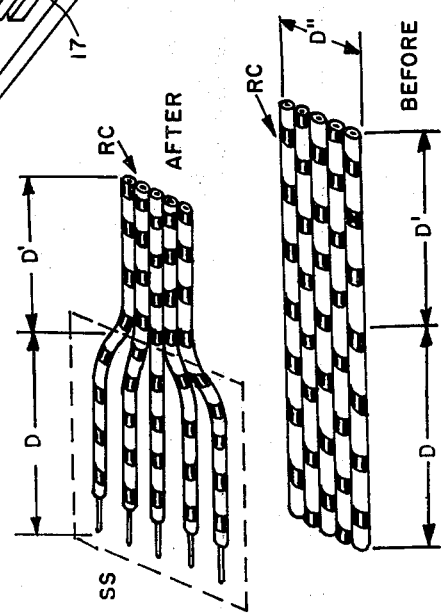
FIG. 2 is a perspective view of ribbon conductor cable before and after preparation.

Cable RC is placed in, and passed through, a groove 14 provided in support member 12 and into the groove 15. As the cable RC enters the groove 15, it is grasped between drive rollers 101 and 103. As drive roller 101 is rotating in the direction of annular arrow 102, drive roller 103 begins to turn in the direction of annular arrow 104. In turn, feed control means 6 via electrical-mechanical clutch 113 turns in the direction of arcuate arrow 111 via conventional pulley and belt means indicated generally by the arrow 110. (Feed control means 6 is set using a calibrated dial 20 provided on the means so that a desired length of cable RC to be prepared is fed into the preparation unit 2, as say, required in the aforementioned application the distance D as shown in FIG. 2.)

As can be discerned, feed control means 6 is turned proportional to the amount of cable RC being fed into the preparation unit 2. Therefore, when cable RC has been fed into preparation unit 2 the distance D, a projection 105 which is a portion of calibrated dial 20 has also rotated in the direction of arcuate arrow 111. Projection 105 makes contact with an causes switch 106 to "open." When switch 106 opens, drive means 100 is deactivated and simultaneously (1) drive roller 101 is stopped; hence, cable RC ceases to be fed into the preparation unit, (2) electrical-mechanical clutch 113 is deactivated allowing feed control member 6 including projection 105 to move in a direction opposite to arcuate arrow 111 due to action of spring 114 which is connected to feed control means 6 via pulley 115, (3) the function means causes movable carriage 31 to move in the direction of arrow 35 to prepare the end of cable RC as shown in FIG. 2, and (4) securing member 9 of movable length determining means 3 secures cable RC in the groove 14.

When movable carriage 31 has moved in the direction of arrow 35 to its most rearward position, cable RC will have been prepared as already indicated and the movable block 32 will be raised allowing cable RC to be removed from the preparation unit. The means to raise and lower, "open and close," the preparation unit 2 will be further discussed later in this description. In addition, a projection 23 carried by movable carriage 31 activates a switch 22. Activating switch causes the function means to move cutting member 10 such that cable RC is cut along the line D as shown in FIG. 2.

In the embodiment shown in FIG. 1, conventional counter 34 indicates the number of lengths of cable prepared.

As can be discerned from the above description, a length of cable RC has been prepared. A next activation of activator unit 4 again puts machine M in a condition to prepare a next length of cable RC as previously discussed.

Figure 3:
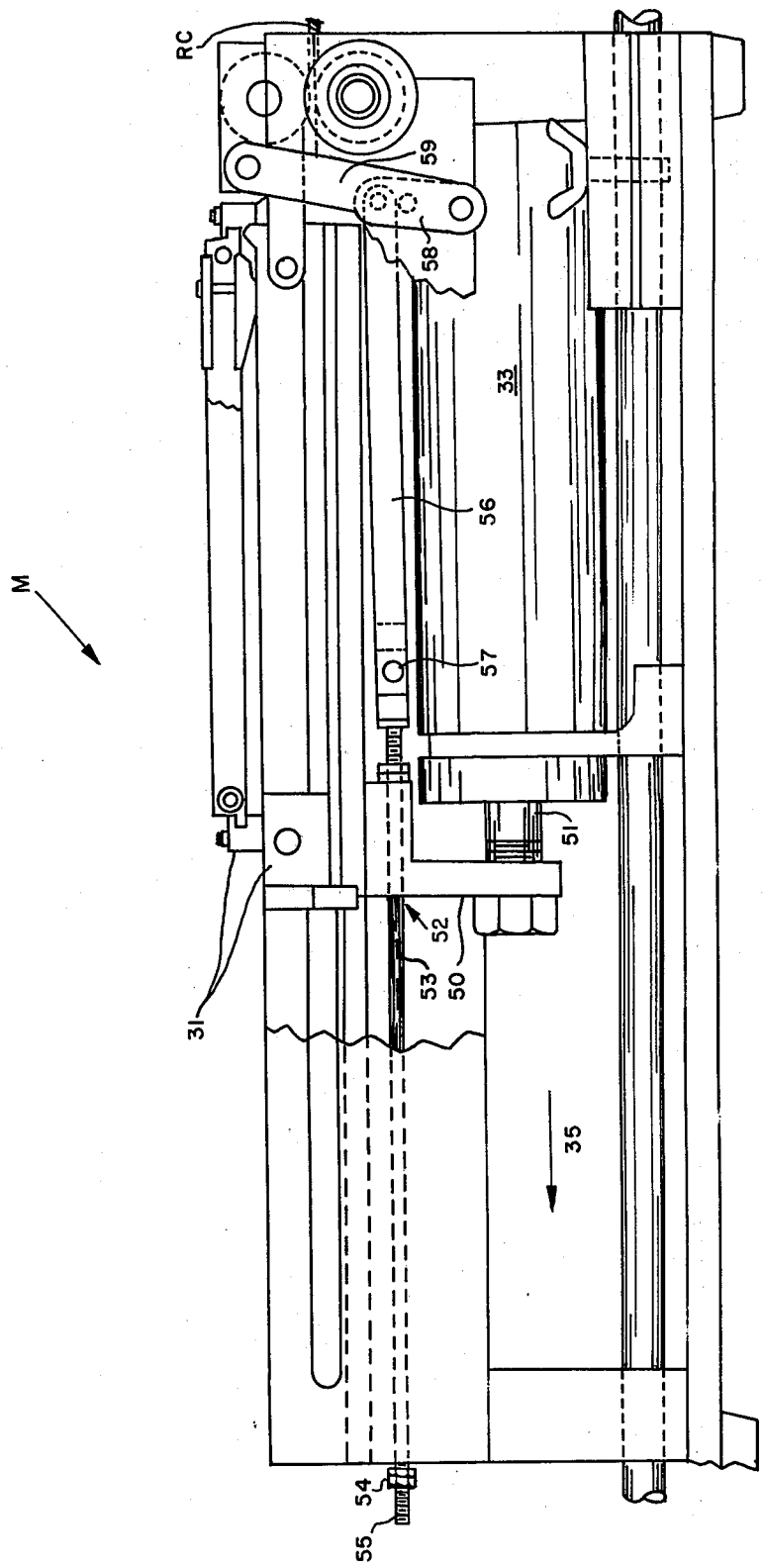
FIG. 3 is a side view of the machine for preparing cable according to the present invention showing details for closing the machine.
Figure 4:
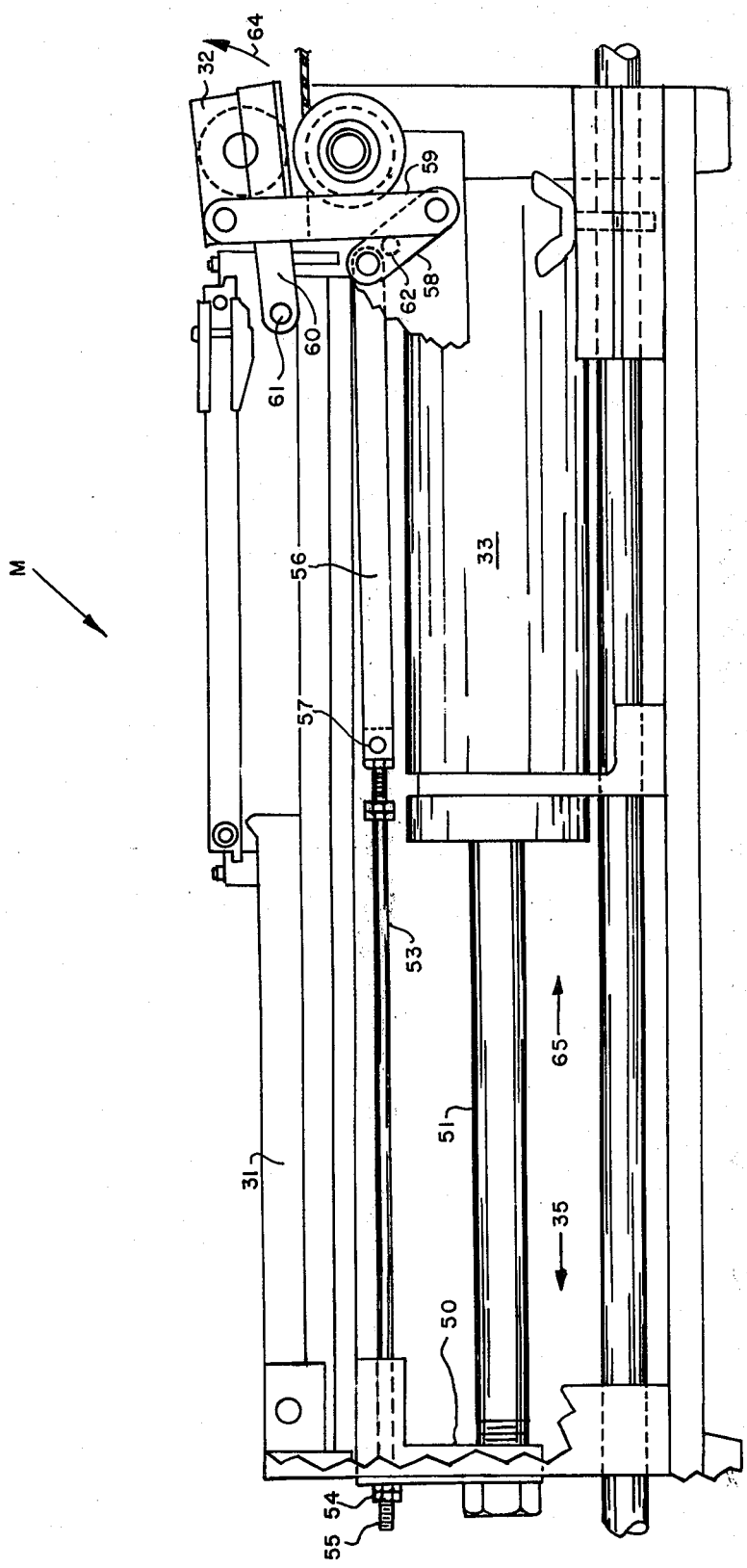
FIG. 4 is a side view of the machine for preparing cable according to the present invention showing details for opening the machine.

Referring now to FIGS. 2 and 3, there is shown a side view of the machine M so that details of authomatically opening and closing of the preparation unit can be understood. An L-shaped member 50 is connected to movable carriage member 31 and to a shaft 51 extending from cylinder 33. L-shaped member 50 is provided with an opening 52 therethrough, through which a connecting rod 53 passes. Opening 52 is of the magnitude so that rod 53 passing therethrough is unobstructed. Connecting rod 53 is provided with an adjustable stopping means such as a conventional nut 54 on a threaded end portion 55. The other end of connecting rod 53 has a similar adjustment means and is pivotally connected to a next connecting rod 56 at the point 57. Connecting rod 56 is connected to a throw rod 58 which, in twin, is connected to a next throw rod 59. Throw rod 59 is, in turn, connected to movable block 32 which is pivotally connected to the preparation unit 2 via rod 60 at the point 61. As can be discerned from the drawings, as shaft 51 extends in the direction of arrow 35, movable carriage 31 also moves in the direction of arrow 35 to prepare the cable RC as previously dicussed, nut 54 is contacted by L-shaped member 50. Thus, connecting rod 53 pulls connecting rod 56.

Throw rod 58, which is pivotally connected at the point 62, forces movable block member 32 in the direction of arcuate arrow 64 or to the "open position." As is now discernable, as shaft 51 is moved in the direction of arrow 65 movable block unit 32 in moved to the "closed position."

While there has been shown and described the preferred embodiments of the present invention, it will be apparent to those skilled in the art that many changes and modifications may be made without departing from the invention in its broader aspects. For example, and as previously described, cable RC is grasped between the drive rollers 101, 103 and fed into preparation unit 2. As there are several types of commercially produced flat-ribbon type cables, cable RC will have different thickness valves depending upon conductor cross-section area and insulation thickness thereof. To compensate for such changes in thickness, etc. drive roller 101 is mounted on stationary block member 30 using a conventional non-concentric bearing member 36. (A second non-concentric bearing member, not shown, must also be used for obvious reasons.) Thus, drive roller 101 can be positioned relative to drive roller 103 to compensate for changes in thickness of cable RC. For the purpose of clearing the preparation unit 2, and in addition to the means described in the discussed application, movable block member 32 may be opened manually. This is accomplished by removing the pivot rod 40 having a grasp means 41.

Therefore, the appended claims are intended to cover all such changes and modifications that fall within the true spirit and scope of the invention.

The invention is claimed in accordance with the following:

1. A machine for preparing cable, comprising:
    cable receiving means for receiving a length of cable to be prepared;
    control means to control the amount of cable received by said receiving means;
    movable cable length determining means carried by said cable receiving means; and
    operating means connected to said control means for operating same.

2. The machine according to claim 1 wherein said cable receiving means further comprises:
    a cable preparation area for preparing the length of cable received in accordance with a preselected pattern; and
    a cable feed mechanism including a first roller means mounted non-concentrically and a second roller means, said first roller means non-concentrically aligned with said second roller means.

3. The machine according to claim 1 wherein said control means defines an electrical mechanical clutch means including dial means for setting the amount of cable received.

4. The machine according to claim 1 wherein said movable cable length determining means further comprises:
    a stationary member across which said received cable passes;
    a first movable member carried by said stationary member for securing said received cable during preparation; and
    a second movable member carried by said stationary member for shearing said received cable after preparation.

5. The machine according to claim 1 wherein said operating means further comprises:
    a drive means defining a motor means to operate said cable receiving means and said control means;
    a function means defining pneumatic means to operate said cable receiving means and said movable length determining means; and
    a switch means to operate said drive means and said function means.

6. A machine for preparing cable having a plurality of side-by-side insulated conductors, comprising:
    cable receiving means for receiving a length of cable to be prepared, said cable receiving means including a cable preparation area to prepare the first received end portion of the cable in a preselected pattern and drive roller means including a first roller member in non-concentric alignment with a second roller member for feeding said length of cable into said cable preparation area;
    control means including dial setting means connected to said drive roller means to set the length of cable received by said cable receiving means;
    function means connected to said control means to cause said received length of cable in said preparation area to be prepared; and
    movable cable length determining means carried by said cable receiving means, said movable cable length determining means including securing and cutting members operated by said function means.

7. A machine for processing in a preselected pattern a first end portion of ribbon cable means and shearing a second end portion of said ribbon cable means, said ribbon cable means having insulated electrical conductors, comprising;
    means for feeding the first end portion of the ribbon cable means through a first preparation area and into a second preparation area;
    means in said first preparation area for shearing said second end portion of said ribbon cable means;
    means in said second preparation area to process in a preselected pattern said first end portion of said ribbon cable means; and
    operating means connected to the means for feeding, the means for shearing, and the means for preparing for operating same.

8. The machine according to claim 7 wherein said means for feeding defines a first roller member and a second roller member in non-concentric alignment with one another, said second roller member connected to the operating means.

9. The machine according to claim 7 wherein said means in said first preparation area for shearing said second end portion of said ribbon cable defines a cutting member and a securing member, said members connected to the operating means.

10. The machine according to claim 7 wherein said operating means defines motor means and pneumatic means.

11. In a device for preparing an end of electrical cable means having a plurality of insulated electrical conductors connected together via insulation thereof and cutting the cable means to a desired length:
    a receiving area including clamping means and shearing means through which the cable means extends;
    a preparing area including cable preparing means and having a channel for receiving an end of the cable means;
    feed means provided by said stationary and movable cable preparing means for feeding the cable means into said channel;
    means for operating said feed means for feeding a predetermined length of the cable means into said preparing means; and
    control means operated by said operating means for actuating said cable preparing means for preparing the end of the cable means, for actuating said clamping means for clamping the cable means therein and for actuating said shearing means after the cable end has been prepared by said cable preparing means to shear the cable means.

* * * * *

UNITED STATES PATENT OFFICE
CERTIFICATE OF CORRECTION

PATENT NO. : 3,922,934
DATED : December 2, 1975
INVENTOR(S) : ROBERT COOPER HIATT It is certified that error appears in the above-identified patent and that said Letters Patent are hereby corrected as shown below:

Column 4, Line 25, "authomatically" should be --automatically--

Column 4, Line 38, "in twin" whould be --in turn--

Column 4, Line 45, "dicussed" should be --discussed--

Signed and Sealed this first Day of June 1976

[SEAL]

Attest:

RUTH C. MASON
Attesting Officer

C. MARSHALL DANN
Commissioner of Patents and Trademarks